(12) United States Patent
Yoshimaru et al.

(10) Patent No.: US 9,923,181 B2
(45) Date of Patent: *Mar. 20, 2018

(54) LAMINATE, NON-AQUEOUS ELECTROLYTE SECONDARY BATTERY SEPARATOR INCLUDING THE LAMINATE, AND NON-AQUEOUS ELECTROLYTE SECONDARY BATTERY INCLUDING THE LAMINATE

(71) Applicant: SUMITOMO CHEMICAL COMPANY, LIMITED, Tokyo (JP)

(72) Inventors: Chikae Yoshimaru, Osaka (JP); Kosuke Kurakane, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 14/771,121

(22) PCT Filed: Jul. 21, 2015

(86) PCT No.: PCT/JP2015/070730
§ 371 (c)(1),
(2) Date: Aug. 27, 2015

(87) PCT Pub. No.: WO2016/056288
PCT Pub. Date: Apr. 14, 2016

(65) Prior Publication Data
US 2016/0372728 A1  Dec. 22, 2016

(30) Foreign Application Priority Data
Oct. 10, 2014  (JP) ................. 2014-209415

(51) Int. Cl.
*H01M 2/16* (2006.01)
*B32B 5/32* (2006.01)
(Continued)

(52) U.S. Cl.
CPC ............. *H01M 2/1686* (2013.01); *B32B 5/32* (2013.01); *H01M 2/166* (2013.01); *B32B 15/085* (2013.01);
(Continued)

(58) Field of Classification Search
CPC ........................... H01M 2/166; H01M 2/1686
(Continued)

(56) References Cited

U.S. PATENT DOCUMENTS 6,627,346 B1  9/2003 Kinouchi et al.
2007/0264577 A1  11/2007 Katayama et al.
(Continued)

FOREIGN PATENT DOCUMENTS

CN  101276895 A  10/2008
CN  102244223 A  11/2011
(Continued)

OTHER PUBLICATIONS

Communication dated Mar. 1, 2016, from the Japanese Patent Office in counterpart application No. 2015-537062.
(Continued)

*Primary Examiner* — Basia Ridley
*Assistant Examiner* — James Erwin
(74) *Attorney, Agent, or Firm* — Sughrue Mion, PLLC

(57) ABSTRACT

Provided is a laminate which is capable of ensuring a high level of safety by preventing an internal short circuit due to, for example, breakage of a non-aqueous electrolyte secondary battery while maintaining various performance capabilities of the non-aqueous electrolyte secondary battery. A laminate (10) includes: a porous film containing polyolefin
(Continued)

as a main component; and a porous layer containing fine particles; the porous layer being laminated to at least one side of the porous film, in an electrical conduction test by nail penetration in which test a displacement in a thickness direction of the laminate (10) during a period from when a dielectric breakdown occurs in the laminate (10) to when the laminate (10) is brought into electrical conduction is measured by use of a nail (2) of N50 specified in JIS A 5508 and under a condition in which the nail (2) descends at a descending speed of 50 μm/min, the displacement being not less than 20 μm and not more than 200 μm.

7 Claims, 2 Drawing Sheets

(51) Int. Cl.
    *B32B 27/32*    (2006.01)
    *B32B 15/085*   (2006.01)
    *B32B 15/20*    (2006.01)
    *B32B 27/20*    (2006.01)
    *C09D 1/00*    (2006.01)

(52) U.S. Cl.
    CPC ............ *B32B 15/20* (2013.01); *B32B 27/205* (2013.01); *B32B 27/32* (2013.01); *B32B 2255/06* (2013.01); *B32B 2255/10* (2013.01); *B32B 2255/20* (2013.01); *B32B 2255/26* (2013.01); *B32B 2264/10* (2013.01); *B32B 2264/102* (2013.01); *B32B 2264/108* (2013.01); *B32B 2264/12* (2013.01); *B32B 2307/58* (2013.01); *B32B 2307/718* (2013.01); *B32B 2307/732* (2013.01); *B32B 2457/10* (2013.01); *B32B 2571/00* (2013.01); *C09D 1/00* (2013.01); *H01M 2/1646* (2013.01); *H01M 2/1653* (2013.01)

(58) Field of Classification Search
    USPC ........................................................ 429/145
    See application file for complete search history.

(56) References Cited

U.S. PATENT DOCUMENTS

| | | |
|---|---|---|
| 2009/0053609 A1 | 2/2009 | Minami et al. |
| 2009/0067119 A1 | 3/2009 | Katayama et al. |
| 2010/0209767 A1 | 8/2010 | Kasamatsu et al. |
| 2012/0301774 A1 | 11/2012 | Jiang et al. |
| 2013/0059192 A1 | 3/2013 | Kajita et al. |
| 2014/0329154 A1 | 11/2014 | Shinoda et al. |

FOREIGN PATENT DOCUMENTS

| | | |
|---|---|---|
| CN | 102983300 A | 3/2013 |
| JP | 2001-135295 A | 5/2001 |
| JP | 2002-141049 A | 5/2002 |
| JP | 2007-95575 A | 4/2007 |
| JP | 2007-311367 A | 11/2007 |
| JP | 2008123988 A | 5/2008 |
| JP | 2008-270090 A | 11/2008 |
| JP | 2009-158266 A | 7/2009 |
| JP | 2010108753 A | 5/2010 |
| JP | 2010-135313 A | 6/2010 |
| JP | 2010-250954 A | 11/2010 |
| JP | 2010-277723 A | 12/2010 |
| JP | 2011-54298 A | 3/2011 |
| JP | 2011-146365 A | 7/2011 |
| JP | 2011181493 A | 9/2011 |
| JP | 2011-198532 A | 10/2011 |
| JP | 2012-33268 A | 2/2012 |
| JP | 2012134024 A | 7/2012 |
| JP | 2013-22876 A | 2/2013 |
| JP | 5219621 B2 | 6/2013 |
| JP | 2013-149434 A | 8/2013 |
| JP | 2013-173862 A | 9/2013 |
| JP | 2014-40580 A | 3/2014 |
| JP | 2014086231 A | 5/2014 |
| JP | 2014-103124 A | 6/2014 |
| WO | 2013/015228 A1 | 1/2013 |
| WO | 2013/031872 A1 | 3/2013 |

OTHER PUBLICATIONS

Communication dated Mar. 1, 2016, from the Japanese Patent Office in counterpart application No. 2015-537060.
Communication dated Oct. 31, 2016, issued by the Korean Intellectual Property Office in counterpart application No. 10-2015-7023467.
Communication dated Oct. 31, 2016, issued by the Korean Intellectual Property Office in counterpart 10-2015-7023469 corresponding to U.S. Appl. No. 14/771,149.
U.S. Appl. No. 14/771,149, filed Aug. 27, 2015. (Co-Pending Application).
International Search Report dated Sep. 8, 2015 in counterpart application No. PCT/JP2015/070731.
Communication dated Sep. 29, 2015 from the Japanese Patent Office in counterpart application No. 2015-537062.
Communication dated Sep. 29, 2015 from the Japanese Patent Office in counterpart application No. 2015-537060.
International Search Report dated Sep. 8, 2015 in counterpart application No. PCT/JP2015/070730.
Office Action dated Mar. 21, 2017, issued in U.S. Appl. No. 14/771,149.
Communication dated Apr. 28, 2017, from the Korean Intellectual Property Office, in counterpart Korean application No. 10-2015-7023467.
Communication dated Apr. 28, 2017, from the Korean Intellectual Property Office, in counterpart Korean application No. 10-2015-7023469.
International Preliminary Report on Patentability with the translation of Written Opinion dated Apr. 20, 2017, issued by the International Bureau in International application No. PCT/JP2015/070730.
International Preliminary Report on Patentability with the translation of Written Opinion dated Apr. 20, 2017, issued by the International Bureau in International application No. PCT/JP2015/070731.
Communication dated Aug. 22, 2017, from Korean Intellectual Property Office in counterpart application No. 10-2015-7023467.
Communication dated Aug. 22, 2017, from Korean Intellectual Property Office in counterpart application No. 10-2015-7023469.
Communication dated Sep. 5, 2017, from the State Intellectual Property Office of the P.R.C. In counterpart application No. 201580000340.7.

Fig. 2
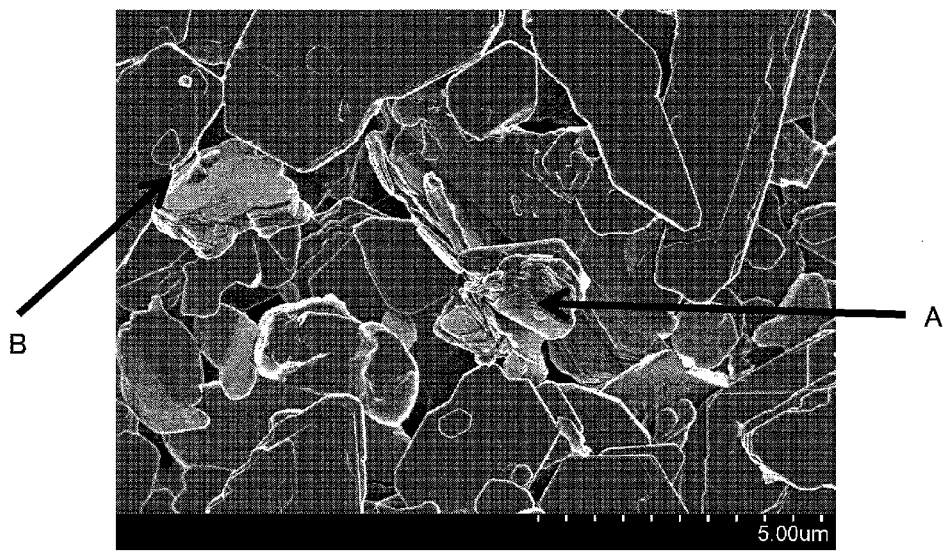
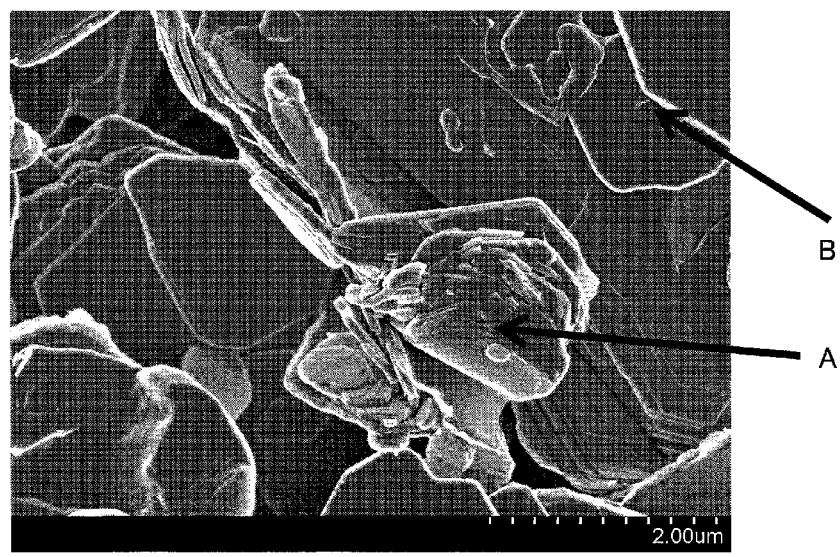

LAMINATE, NON-AQUEOUS ELECTROLYTE SECONDARY BATTERY SEPARATOR INCLUDING THE LAMINATE, AND NON-AQUEOUS ELECTROLYTE SECONDARY BATTERY INCLUDING THE LAMINATE

CROSS REFERENCE TO RELATED APPLICATIONS

This application is a National Stage of International Application No. PCT/JP2015/070730 filed Jul. 21, 2015, claiming priority based on Japanese Patent Application No. 2014-209415, filed Oct. 10, 2014, the contents of all of which are incorporated herein by reference in their entirety.

TECHNICAL FIELD

The present invention relates to a laminate, a non-aqueous electrolyte secondary battery separator including the laminate, and a non-aqueous electrolyte secondary battery including the laminate.

BACKGROUND ART

A non-aqueous electrolyte secondary battery typified by a lithium ion secondary battery has a high energy density. Thus, a non-aqueous electrolyte secondary battery is currently being widely used as a battery for use in devices such as a personal computer, a mobile phone, and a mobile information terminal.

However, a non-aqueous electrolyte secondary battery may be heated by a flow of a high current in a case where an internal short circuit or an external short circuit is caused by breakage of the non-aqueous electrolyte secondary battery or breakage of a device in which the non-aqueous electrolyte secondary battery is used. Thus, a non-aqueous electrolyte secondary battery is required to ensure a high level of safety by preventing an internal short circuit due to, for example, breakage of the non-aqueous electrolyte secondary battery while maintaining various performance capabilities such as a rate characteristic and a resistance characteristic (solution resistance) of the non-aqueous electrolyte secondary battery.

Examples of a proposed non-aqueous electrolyte secondary battery whose safety has been improved by preventing an internal short circuit include: (1) a non-aqueous electrolyte secondary battery in which an inorganic compound containing flaky particles is dispersed in a separator and the inorganic compound is oriented so as to be substantially parallel to a surface of the separator (Patent Literature 1); (2) a non-aqueous electrolyte secondary battery in which an inorganic particle layer containing spherical inorganic particles and amorphous inorganic particles is laminated to an electrode surface (Patent Literature 2); and (3) a non-aqueous electrolyte secondary battery in which a porous layer containing: a first insulating inorganic filler containing a metallic hydroxide and/or a hydrate of a metallic oxide; and a second insulating inorganic filler having a thermal conductivity of not less than 10 W/m·K is laminated to a porous film (Patent Literature 3).

Note that examples of a proposed method for evaluating safety of a non-aqueous electrolyte secondary battery include: (1) a safety evaluation method by placing a foreign object at a location inside a non-aqueous electrolyte secondary battery at which location a cathode and an anode face each other, and pressing the location to locally crush an insulating layer interposed between the cathode and the anode, thereby causing an internal short circuit (Patent Literature 4); (2) a safety evaluation method by inserting, from a pointed head of a non-aqueous electrolyte secondary battery into a depth where an internal short circuit is generated, an insulated bar including an electrically conductive member (Patent Literature 5); and (3) a safety evaluation method by impressing a load on a needle equipped with a tip part made of a conductive member, inserting the tip part of the needle into an insulation layer laminated on an electrode, making the tip part to reach the electrode, and measuring, at time lapses, the load as well as an electric resistance between the tip part of the needle and the electrode (Patent Literature 6).

CITATION LIST

Patent Literature

[Patent Literature 1]
  Japanese Patent Application Publication, Tokukai, No. 2007-311367 A (Publication Date: Nov. 29, 2007)
[Patent Literature 2]
  Japanese Patent No. 5219621 (Registration Date: Mar. 15, 2013)
[Patent Literature 3]
  Japanese Patent Application Publication, Tokukai, No. 2013-149434 A (Publication Date: Aug. 1, 2013)
[Patent Literature 4]
  Japanese Patent Application Publication, Tokukai, No. 2008-270090 A (Publication Date: Nov. 6, 2008)
[Patent Literature 5]
  Japanese Patent Application Publication, Tokukai, No. 2010-250954 A (Publication Date: Nov. 4, 2010)
[Patent Literature 6]
  Japanese Patent Application Publication, Tokukai, No. 2009-158266 A (Publication Date: Jul. 16, 2009)

SUMMARY OF INVENTION

Technical Problem

Such a non-aqueous electrolyte secondary battery as described above is required to maintain various performance capabilities thereof such as a rate characteristic and a resistance characteristic so as to be repeatedly used.

However, the non-aqueous electrolyte secondary batteries described in Patent Literatures 1 through 3 each have a problem of, though capable of preventing an internal short circuit due to, for example, breakage of a non-aqueous electrolyte secondary battery, being insufficient to maintain various performance capabilities of the non-aqueous electrolyte secondary battery (this conflicts an improvement in safety). That is, the non-aqueous electrolyte secondary batteries described in Patent Literatures 1 through 3 are each insufficient to maintain the various performance capabilities.

The circumstances require: (i) a laminate in which a high level of safety is ensured by preventing an internal short circuit due to, for example, breakage of a non-aqueous electrolyte secondary battery while maintaining various performance capabilities such as a rate characteristic and a resistance characteristic (solution resistance) of the non-aqueous electrolyte secondary battery (occurrence of the internal short circuit counters the maintenance of the various performance capabilities); and (ii) a non-aqueous electrolyte secondary battery separator including the laminate.

According to the safety evaluation methods described in Patent Literatures 4 and 5, safety of a non-aqueous electrolyte secondary battery that has been assembled is evaluated. This makes it impossible to evaluate safety of a separator that has not been assembled. Meanwhile, the safety evaluation method described in Patent Literature 6 makes it possible to evaluate the insulation layer by measuring data until a separator is completely electrically conductive, but makes it impossible to evaluate safety associated with prevention of an internal short circuit of the separator. Thus, even in a case where any one of the safety evaluation methods described in Patent Literatures 4 through 6 is employed, it is impossible to provide (i) a laminate in which a high level of safety is ensured while various performance capabilities of a non-aqueous electrolyte secondary battery are maintained; (ii) a non-aqueous electrolyte secondary battery separator including the laminate; and (iii) a non-aqueous electrolyte secondary battery including the laminate.

The present invention has been made in view of the problems, and a main object of the present invention is to provide (i) a laminate which is capable of ensuring a high level of safety by preventing an internal short circuit due to, for example, breakage of a non-aqueous electrolyte secondary battery while maintaining various performance capabilities such as a rate characteristic and a resistance characteristic of the non-aqueous electrolyte secondary battery; (ii) a non-aqueous electrolyte secondary battery separator including the laminate; and (iii) a non-aqueous electrolyte secondary battery including the laminate.

Solution to Problem

As a result of diligent study carried out by inventors of the present invention, the inventors finally accomplished the present invention by finding that a laminate including: a porous film containing polyolefin as a main component; and a porous layer containing fine particles; the porous layer being laminated to at least one side of the porous film, in an electrical conduction test by nail penetration in which test a displacement in a thickness direction of the laminate during a period from when a dielectric breakdown occurs in the laminate to when the laminate is brought into electrical conduction is measured by use of a nail of N50 specified in JIS A 5508 and under a condition in which the nail descends at a descending speed of 50 μm/min, the displacement being not less than 20 μm and not more than 200 μm makes it possible to ensure a high level of safety by preventing an internal short circuit due to, for example, breakage of a non-aqueous electrolyte secondary battery while maintaining various performance capabilities such as a rate characteristic and a resistance characteristic of the non-aqueous electrolyte secondary battery.

In order to attain the object, a laminate includes: a porous film containing polyolefin as a main component; and a porous layer containing fine particles; the porous layer being laminated to at least one side of the porous film, in an electrical conduction test by nail penetration in which test a displacement in a thickness direction of the laminate during a period from when a dielectric breakdown occurs in the laminate to when the laminate is brought into electrical conduction is measured by use of a nail of N50 specified in JIS A 5508 and under a condition in which the nail descends at a descending speed of 50 μm/min, the displacement being not less than 20 μm and not more than 200 μm.

The laminate is more preferably arranged such that the porous layer contains, per square meter thereof, a porous layer component having, per one side of the porous layer, a volume of 0.5 $cm^3$ to 20 $cm^3$.

The laminate is more preferably arranged such that the porous layer has, per one side thereof, a thickness of 0.5 μm to 15 μm, and the porous film has a thickness of 5 μm to 30 μm.

The laminate is more preferably arranged such that the porous film has a porosity of 30% by volume to 60% by volume.

The laminate is more preferably arranged such that the fine particles are inorganic fine particles.

The laminate is more preferably arranged such that the porous layer further contains a binder resin, and the fine particles are in point contact with the binder resin.

The laminate is more preferably arranged such that the fine particles have cleavability.

The laminate is more preferably arranged such that the porous film has a weight per unit area of 4 $g/m^2$ to 20 $g/m^2$.

The laminate is more preferably arranged such that the porous layer has, per one side thereof, a weight per unit area of 1 $g/m^2$ to 20 $g/m^2$.

A non-aqueous electrolyte secondary battery separator in accordance with the present invention and a non-aqueous electrolyte secondary battery in accordance with the present invention each include the laminate.

Advantageous Effects of Invention (i) A laminate in accordance with the present invention and (ii) a non-aqueous electrolyte secondary battery separator including the laminate each yield an effect of ensuring a high level of safety by preventing an internal short circuit due to, for example, breakage of a non-aqueous electrolyte secondary battery while maintaining various performance capabilities such as a rate characteristic and a resistance characteristic (solution resistance) of the non-aqueous electrolyte secondary battery (occurrence of the internal short circuit counters the maintenance of the various performance capabilities).

BRIEF DESCRIPTION OF DRAWINGS

FIG. 2 has images each obtained by observing, by use of a scanning electron microscope, a laminated porous film obtained in Example 1.

DESCRIPTION OF EMBODIMENTS

Figure 1:
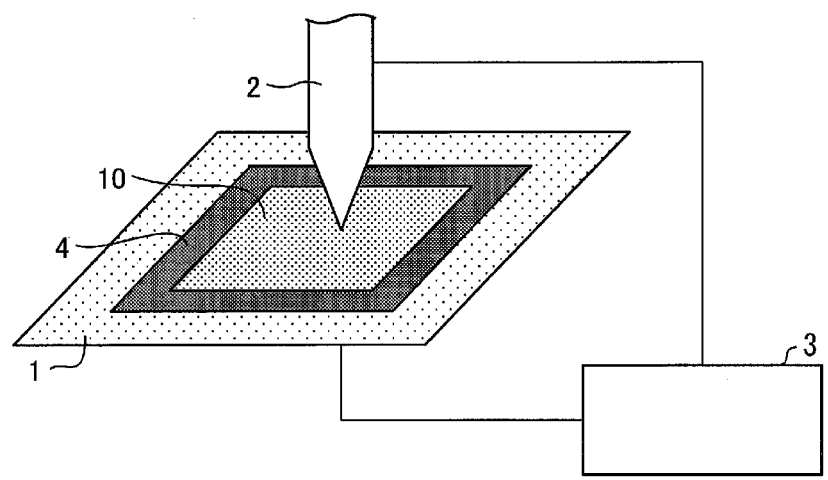
FIG. 1 is a perspective view schematically illustrating a measuring apparatus of the present invention for use in an electrical conduction test by nail penetration.

An embodiment of the present invention is specifically described below. Note that "A to B" herein refers to "not less than A and not more than B".

A laminate in accordance with the present invention is a laminate including: a porous film containing polyolefin as a main component; and a porous layer containing fine particles; the porous layer being laminated to at least one side of the porous film, in an electrical conduction test by nail penetration in which test a displacement in a thickness direction of the laminate during a period from when a dielectric breakdown occurs in the laminate to when the laminate is brought into electrical conduction is measured by use of a nail of N50 specified in JIS A 5508 and under a condition in which the nail descends at a descending speed of 50 μm/min, the displacement being not less than 20 μm and not more than 200 μm.

<Porous Film>

A porous film of the present invention is a base material of a non-aqueous electrolyte secondary battery separator and contains polyolefin as a main component. The porous film has therein many pores that are connected to each other. This allows gas or liquid to pass through the porous film from one side to the other side of the porous film.

The polyolefin contained in the porous film accounts for not less than 50% by volume, more preferably not less than 90% by volume, and still more preferably not less than 95% by volume of the entire porous film. Further, the polyolefin more preferably contains a high-molecular weight component having a weight average molecular weight of $5\times10^5$ to $15\times10^6$. In particular, the polyolefin more preferably contains a high-molecular weight component having a weight average molecular weight of not less than 1,000,000. This is because the polyolefin containing such a high-molecular weight component allows an increase in strength of the porous film and consequently allows an increase in strength of a laminate including the porous film.

Specific examples of the polyolefin, which is a thermoplastic resin, include: homopolymers obtained by polymerizing monomers such as ethylene, propylene, 1-butene, 4-methyl-1-pentene, and 1-hexene (e.g., polyethylene, polypropylene, and polybutene); and copolymers obtained by copolymerizing the monomers (e.g., an ethylene-propylene copolymer). Of these polyolefins, polyethylene, which is capable of preventing (shutting down) a flow of an overcurrent at a lower temperature, is more preferably used as the polyolefin. Examples of the polyethylene include low density polyethylene, high density polyethylene, linear polyethylene (an ethylene-α-olefin copolymer), ultrahigh molecular weight polyethylene having a weight average molecular weight of not less than 1,000,000, and the like. In particular, ultrahigh molecular weight polyethylene having a weight average molecular weight of not less than 1,000,000 is more preferable.

The porous film only needs to have a thickness that is appropriately determined in view of a thickness of a laminate. In a case where the porous film is used as a base material to form a laminate by laminating a porous layer to one side or both sides of the porous film, the porous film has a thickness preferably of 5 μm to 30 μm and more preferably of 10 μm to 20 μm.

The porous film which has a thickness of less than 5 μm makes it impossible to sufficiently prevent an internal short circuit due to, for example, breakage of a non-aqueous electrolyte secondary battery as which the laminate is used. In addition, the porous film which has a thickness of less than 5 μm causes the porous film to retain an electrolyte in a lower amount. Meanwhile, the porous film which has a thickness of more than 30 μm causes an increase in permeation resistance of lithium ions in the entire non-aqueous electrolyte secondary battery separator as which the laminate is used. Thus, repeated cycles cause a deterioration in cathode of the non-aqueous electrolyte secondary battery and consequently cause a deterioration in rate characteristic and/or cycle characteristic of the non-aqueous electrolyte secondary battery. Further, the porous film which has a thickness of more than 30 μm causes a longer distance between a cathode and an anode of the non-aqueous electrolyte secondary battery, so that the non-aqueous electrolyte secondary battery is made larger.

The porous film only needs to have a weight per unit area which weight is appropriately determined in view of a strength, a thickness, a weight, and handleability of the laminate. In a case where the laminate is used as the non-aqueous electrolyte secondary battery separator, the porous film normally has a weight per unit area preferably of 4 $g/m^2$ to 20 $g/m^2$ and more preferably of 5 $g/m^2$ to 12 $g/m^2$. The porous film which has a weight per unit area which weight falls within such a numerical range allows an increase in weight energy density or volume energy density of the non-aqueous electrolyte secondary battery including the porous film.

The porous film has an air permeability of a Gurley value preferably of 30 sec/100 mL to 500 sec/100 mL and more preferably of 50 sec/100 mL to 300 sec/100 mL. The porous film which has an air permeability falling within the above range makes it possible to obtain sufficient ion permeability in a case where the laminate is used as the non-aqueous electrolyte secondary battery separator.

The porous film has a porosity preferably of 30% by volume to 60% by volume and more preferably of 35% by volume to 55% by volume. The porous film which has the porosity thus set (i) allows the porous film to retain the electrolyte in a larger amount and (ii) makes it possible to obtain a function to prevent (shut down) a flow of an overcurrent at a lower temperature without fail.

The porous film which has a porosity of less than 30% by volume increases in resistance thereof. Meanwhile, the porous film which has a porosity of more than 60% by volume decreases in mechanical strength thereof.

The porous film has pores having a pore size preferably of not more than 3 μm and more preferably of not more than 1 μm. In a case where the laminate including the porous film in which the pore size is thus set is used as the non-aqueous electrolyte secondary battery separator, it is possible to obtain sufficient ion permeability and to prevent particles from entering the cathode and/or the anode.

A method for producing the porous film is not particularly limited. The method can be exemplified by, for example, a method in which a resin such as polyolefin to which a plasticizer is added is formed into a film and then the plasticizer is removed by use of an appropriate solvent.

Specifically, for example, a porous film that is produced by use of polyolefin resin containing ultrahigh molecular weight polyethylene and low molecular weight polyolefin having a weight average molecular weight of not more than 10,000 is preferably produced by a method below from the viewpoint of production cost. The method includes the steps of:

(1) obtaining a polyolefin resin composition by kneading (i) 100 parts by weight of ultrahigh molecular weight polyethylene, (ii) 5 parts by weight to 200 parts by weight of low molecular weight polyolefin having a weight average molecular weight of not more than 10,000, and (iii) 100 parts by weight to 400 parts by weight of an inorganic filler such as calcium carbonate;
(2) forming a sheet by use of the polyolefin resin composition;
(3) removing the inorganic filler from the sheet obtained in the step (2); and
(4) obtaining a porous film by drawing the sheet from which the inorganic filler has been removed in the step (3); or
(3') drawing the sheet obtained in the step (2); and
(4') obtaining a porous film by removing the inorganic filler from the sheet which has been drawn in the step (3').

Note that a commercial item having such physical properties as described earlier can also be used as the porous film.

Note also that the porous film is more preferably subjected to a hydrophilization treatment before a porous layer is formed, i.e., before the porous film is coated with a coating slip (described later). The porous film which is subjected to the hydrophilization treatment allows a higher coating property of the coating slip. This makes it possible to form the porous layer which is more uniform. The hydrophilization treatment is effective in a case where water is contained in a higher ratio to a solvent (dispersion medium) contained in the coating slip. Specific examples of the hydrophilization treatment include publicly-known treatments such as a chemical treatment with acid, alkali, or the like, a corona treatment, and a plasma treatment. Of these treatments, the corona treatment is more preferable. This is because, as compared with the other hydrophilization treatments, the corona treatment (i) allows the porous film to be hydrophilized in a comparatively short time, (ii) causes only a surface and a vicinity of the surface of the porous film to be hydrophilized, and (iii) prevents an inside of the porous film from changing in quality.

The porous film may appropriately include another porous layer other than a porous layer in accordance with the present invention. Examples of the another porous layer include publicly-known porous layers such as a heat-resistant layer, an adhesion layer, and a protective layer. The another porous layer is specifically exemplified by a porous layer having a composition identical to that of the porous layer in accordance with the present invention (described later).

<Porous Layer>

The porous layer in accordance with the present invention is a resin layer containing fine particles and normally containing a resin. The porous layer in accordance with the present invention is preferably a heat-resistant layer or an adhesion layer that is laminated to one side or both sides of the porous film. It is preferable that the resin of which the porous layer is made be insoluble in an electrolyte of a non-aqueous electrolyte secondary battery and be electrochemically stable in a range of use of the non-aqueous electrolyte secondary battery. The porous layer that is laminated to one side of the porous film is preferably laminated to a surface of the porous film which surface faces a cathode of a non-aqueous electrolyte secondary battery as which the porous film is used, and is more preferably laminated to a surface of the porous film which surface is in contact with the cathode.

Examples of the resin of which the porous layer is made include: polyolefins such as polyethylene, polypropylene, polybutene, and an ethylene-propylene copolymer; fluorine-containing resins such as polyvinylidene difluoride (PVDF) and polytetrafluoroethylene; fluorine-containing rubbers such as a vinylidene fluoride-hexafluoropropylene-tetrafluoroethylene copolymer and an ethylene-tetrafluoroethylene copolymer; aromatic polyamide; wholly aromatic polyamide (aramid resin); rubbers such as a styrene-butadiene copolymer and a hydride thereof, a methacrylate ester copolymer, an acrylonitrile-acrylic ester copolymer, a styrene-acrylic ester copolymer, ethylenepropylene rubber, and polyvinyl acetate; resins having a melting point or a glass transition temperature of not less than 180° C. such as polyphenylene ether, polysulfone, polyether sulfone, polyphenylene sulfide, polyether-imide, polyamide-imide, polyether amide, and polyester; hydrosoluble polymers such as polyvinyl alcohol, polyethylene glycol, cellulose ether, sodium alginate, polyacrylic acid, polyacrylamide, and polymethacrylic acid; and the like.

Specific examples of the aromatic polyamide include poly(para-phenyleneterephthalamide), poly(metaphenyleneisophthalamide), poly(parabenzamide), poly(metabenzamide), poly(4, 4'-benzanilideterephthalamide), poly(para-phenylene-4,4'-biphenylenedicarboxylateamide), poly(metaphenylene-4,4'-biphenylenedicarboxylateamide), poly(paraphenylene-2,6-naphthalenedicarboxylateamide), poly(metaphenylene-2, 6-naphthalenedicarboxylateamide), poly(2-chloroparaphenyleneterephthalamide), a para-phenyleneterephthalamide/2,6-dichloroparaphenyleneterephthalamide copolymer, a metaphenyleneterephthalamide/2, 6-dichloroparaphenyleneterephthalamide copolymer, and the like. Of these aromatic polyamides, poly(para-phenyleneterephthalamide) is more preferable.

Of the above resins, a polyolefin, a fluorine-containing resin, aromatic polyamide, and a hydrosoluble polymer are more preferable. In particular, a fluorine-containing resin is particularly preferable in a case where the porous layer is provided so as to face the cathode of the non-aqueous electrolyte secondary battery. Use of a fluorine-containing resin makes it easy to maintain various performance capabilities such as a rate characteristic and a resistance characteristic (solution resistance) of the non-aqueous electrolyte secondary battery even in a case where a deterioration in acidity occurs while the non-aqueous electrolyte secondary battery is being operated. A hydrosoluble polymer, which allows water to be used as a solvent to form the porous layer, is more preferable from the viewpoint of a process and an environmental load, cellulose ether and sodium alginate are still more preferable, and cellulose ether is particularly preferable.

Specific examples of the cellulose ether include carboxymethyl cellulose (CMC), hydroxyethyl cellulose (HEC), carboxyethyl cellulose, methylcellulose, ethyl cellulose, cyanoethyl cellulose, oxyethyl cellulose, and the like. Of these cellulose ethers, CMC and HEC are more preferable, and CMC is particularly preferable. This is because these cellulose ethers less deteriorate while being used for a long time and are excellent in chemical stability.

The porous layer contains fine particles. Fine particles herein refer to organic fine particles or inorganic fine particles generally referred to as a filler. Thus, the above resins each have a function as a binder resin for binding (i) fine particles and (ii) fine particles and the porous film.

Specific examples of organic fine particles contained in the porous layer in the present invention include: a homopolymer of monomers or two or more kinds of copolymers such as styrene, vinyl ketone, acrylonitrile, methyl methacrylate, ethyl methacrylate, glycidylmethacrylate, glycidylacrylate, and methyl acrylate; fluorine-containing resins such as polytetrafluoroethylene, a tetrafluoroethylene-hexafluoropropylene copolymer, a tetrafluoroethylene-ethylene copolymer, and polyvinylidene difluoride; melamine resin; urea resin; polyethylene; polypropylene; polyacrylic acid and polymethacrylic acid; and the like.

Specific examples of inorganic fine particles contained in the porous layer in the present invention include: diamond and graphite; layered silicates such as mica (isinglass), talc (talcum), and montmorillonite; dichalcogenides such as titanium disulfide; boehmite; divalent metal hydroxides such as magnesium hydroxide; layered double hydroxides such as hydrotalcite; layered titanates; layered phosphates such as hydroxyapatite (basic calcium phosphate); clay, silica, diatomaceous earth, magnesium carbonate, calcium carbonate, barium carbonate, magnesium sulfate, calcium sulfate, barium sulfate, aluminium hydroxide, magnesium oxide, calcium oxide, alumina (aluminium oxide), titanium oxide, aluminium nitride, titanium nitride, zeolite, and glass; and the like.

The fine particles may be used in only one kind or in combination of two or more kinds.

In particular, fine particles having cleavability are suitable, and inorganic fine particles are optimum. Inorganic fine particles having cleavability such as diamond and graphite; layered silicates such as mica (isinglass), talc (talcum), and montmorillonite; dichalcogenides such as titanium disulfide; boehmite; divalent metal hydroxides such as magnesium hydroxide; layered double hydroxides such as hydrotalcite; layered titanates; and layered phosphates such as hydroxyapatite are more preferable, and mica and hydroxyapatite are particularly preferable. Note that alumina has many crystal forms such as α-alumina, β-alumina, γ-alumina, and θ-alumina and any one of these crystalline forms is preferably usable. Of these crystalline forms, α-alumina, which is particularly high in thermal stability and chemical stability, is the most preferable.

Cleavability is a property of a crystal that shows a smooth surface by splitting off or peeling off in a specific direction. An inorganic mineral having cleavability has a characteristic of splitting off along a part of an atomic arrangement (e.g., a crystal structure) thereof in which part atoms are less powerful in binding force. For example, cleavability can be evaluated by use of a "cleavability test" described in Japanese Patent Application Publication, "Tokukai, No. 2000-254996 A".

The fine particles change in shape in accordance with, for example, a method for producing an organic matter or an inorganic matter of which the fine particles are made, and/or a condition under which the fine particles are dispersed during preparation of a coating slip for forming the porous layer. The shape of the fine particles is exemplified by various shapes such as a spherical shape, an elliptical shape, a rectangular shape, a gourd shape, and an amorphous shape having no specific shape. Fine particles which have any of these shapes more preferably have cleavability. In a case where the fine particles have cleavability, it is possible to further prevent an internal short circuit due to, for example, breakage of a non-aqueous electrolyte secondary battery.

The fine particles are more preferably in point contact with a binder resin in the porous layer. In a case where the fine particles and the binder resin are in point contact with each other, it is possible to further prevent an internal short circuit due to, for example, breakage of a non-aqueous electrolyte secondary battery.

The inorganic fine particles may be wet-ground by use of a wet grinding device so that an average particle size thereof is controlled. That is, inorganic fine particles having a desired average particle size may be obtained by placing coarse inorganic fine particles and an appropriate solvent in a wet grinding device and wet-grinding the resulting solution. As the solvent, which is not particularly limited, it is desirable to use water from the viewpoint of a process and an environmental load. Alternatively, in view of a coating property of a coating slip (described later), an organic solvent such as a lower alcohol such as methyl alcohol, ethyl alcohol, n-propyl alcohol, isopropyl alcohol, or t-butyl alcohol; or acetone, toluene, xylene, hexane, cyclohexane, tetrahydrofuran, N-methylpyrrolidone, N,N-dimethylacetamide, or N,N-dimethylformamide may be mixed with water.

The wet grinding device is roughly classified into a stirring grinding device and a media grinding device such as a ball mill or a bead mill (DYNO-MILL). It is only necessary to use an optimum grinding device in accordance with a kind of coarse inorganic fine particles. It is optimum that the bead mill (DYNO-MILL), which has a high grinding capability, be used for coarse inorganic fine particles which have a high hardness. The grinding capability of the bead mill is greatly influenced by factors such as a bead quality, a bead diameter, a bead filling factor (with respect to a vessel volume of DYNO-MILL), a flow rate, and a circumferential velocity. Thus, inorganic fine particles having a desired average particle size can be obtained only by collecting, in view of the above factors and in accordance with a desired residence time, a slurry of inorganic fine particles which is obtained by wet grinding. The slurry obtained by wet grinding has a concentration of the inorganic fine particles preferably of 6% by weight to 50% by weight and more preferably of 10% by weight to 40% by weight in.

Note that, in each of a single pass mode and a circulation mode, a residence time can be calculated based on the following equations:

Residence time (single pass mode)(min)=[vessel volume (L)−bead filled volume (L)+bead void volume (L)]/flow rate (L/min)

Residence time (circulation mode)(min)=[{vessel volume (L)−bead filled volume (L)+bead void volume (L)}/slurry amount (L)]×circulation time (min)

The fine particles may be used in combination of two or more kinds that differ from each other in particle diameter and/or specific surface area.

The fine particles are contained in the porous layer in an amount preferably of 1% by volume to 99% by volume and more preferably of 5% by volume to 95% by volume of the porous layer. The fine particles which are contained in the porous layer in an amount falling within the above range make it less likely for a void formed by a contact among fine particles to be blocked by, for example, a resin. This makes it possible to obtain sufficient ion permeability and to set a weight per unit area of the porous film as an appropriate value.

According to the present invention, a coating slip for forming the porous layer is normally prepared by dissolving the resin in a solvent and dispersing the fine particles in the resulting solution.

The solvent (dispersion medium), which is not particularly limited, only needs to (i) have no harmful influence on the porous film, (ii) uniformly and stably dissolve the resin, and (iii) uniformly and stably disperse the fine particles. Specific examples of the solvent (dispersion medium) include: water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, and N,N-dimethylformamide; and the like. The above solvents (dispersion media) may be used in only one kind or in combination of two or more kinds.

The coating slip may be formed by any method provided that the coating slip can meet conditions such as a resin solid content (resin concentration) necessary for obtainment of a desired porous layer and a fine particle weight. Specific examples of a method for forming the coating slip include a mechanical stirring method, an ultrasonic dispersion method, a high-pressure dispersion method, a media dispersion method, and the like. Further, for example, the fine particles may be dispersed in the solvent (dispersion medium) by use of a conventionally publicly-known disperser such as a three-one motor, a homogenizer, a media disperser, or a pressure disperser. In addition, the coating slip can also be prepared simultaneously with wet grinding of fine particles in a case where a liquid in which a resin is dissolved or swelled, or a liquid in which a resin is emulsified is supplied to a wet grinding device during wet grinding carried out to obtain fine particles having a desired average particle size. That is, wet grinding of the fine particles and preparation of the coating slip may be simultaneously carried out in a single step. Further, the coating slip may contain, as a component other than the resin and the fine particles, an additive such as a disperser, a plasticizer, a surfactant, or a pH adjustor, provided that the additive does not impair the object of the present invention. Note that the additive may be contained in an amount that does not impair the object of the present invention.

A method for applying the coating slip to the porous film, i.e., a method for forming the porous layer on a surface of the porous film which has been appropriately subjected to the hydrophilization treatment is not particularly limited. In a case where the porous layer is laminated to both sides of the porous film, (i) a sequential lamination method in which the porous layer is formed on one side of the porous film and then the porous layer is formed on the other side of the porous film, or (ii) a simultaneous lamination method in which the porous layer is formed simultaneously on both sides of the porous film is applicable to the case. Examples of a method for forming the porous layer include: a method in which the coating slip is directly applied to the surface of the porous film and then the solvent (dispersion medium) is removed; a method in which the coating slip is applied to an appropriate support, the porous layer is formed by removing the solvent (dispersion medium), and thereafter the porous layer thus formed and the porous film are pressure-bonded and subsequently the support is peeled off; a method in which the coating slip is applied to the appropriate support and then the porous film is pressure-bonded to an application surface, and subsequently the support is peeled off and then the solvent (dispersion medium) is removed; a method in which the porous film is immersed in the coating slip, dip coating is carried out, and thereafter the solvent (dispersion medium) is removed; and the like. The porous layer can have a thickness that is controlled by adjusting, for example, a thickness of a coated film that is moist (wet) after being coated, a weight ratio between the resin and the fine particles, and/or a solid content concentration (a sum of a resin concentration and a fine particle concentration) of the coating slip. Note that it is possible to use, as the support, a film made of resin, a belt made of metal, or a drum, for example.

A method for applying the coating slip to the porous film or the support is not particularly limited provided that the method allows a necessary weight per unit area and a necessary coating area. It is possible to employ a conventionally publicly-known method as a coating slip application method. Specific examples of such a conventionally publicly-known coating slip application method include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, a spray application method, and the like.

According to the present invention, a coating device including a wrinkle smoothing mechanism is more preferably used to apply the coating slip so that the coating slip can be more uniformly applied to, for example, the base material (porous film). Specifically, the wrinkle smoothing mechanism is more preferably a curved roll (e.g., a bow roll, a banana roll, or a curve roll), a flat expander roll, a helical roll, or a pinch expander.

Examples of a method for applying the coating slip which has a high viscosity preferably include the bar coater method and the die coater method. Meanwhile, examples of a method for applying the coating slip which has a low viscosity preferably include the gravure coater method. In a case where the gravure coater method is used, it is particularly preferable to use the coating device including the pinch expander that serves as the wrinkle smoothing mechanism.

In a case where the coating slip is applied by use of the wrinkle smoothing mechanism while wrinkles of the base material are being smoothed, it is possible to effectively prevent occurrence of unevenness and wrinkles in the porous layer. That is, since there occurs no unevenness in application of the coating slip, uniform coating can be carried out. As a result, the porous layer tends to have a porosity whose degree of variability is small.

The coating device is not particularly limited. Examples of a usable coating device including a wrinkle smoothing mechanism include a coating device described in Japanese Patent Application Publication, "Tokukai, No. 2001-316006 A", and a coating device described in Japanese Patent Application Publication, "Tokukai, No. 2002-60102 A".

Generally, the solvent (dispersion medium) is removed by drying. Examples of a drying method include natural drying, air-blowing drying, heat drying, vacuum drying, and the like. Note, however, that any drying method is usable provided that the drying method allows the solvent (dispersion medium) to be sufficiently removed. Further, drying may be carried out after replacing the solvent (dispersion medium) contained in the coating slip with another solvent. Examples of a method for removing the solvent (dispersion medium) after replacing the solvent (dispersion medium) with another solvent include a method in which a resin is dissolved in the solvent (dispersion medium) contained in the coating slip, another solvent (hereinafter referred to as a solvent X) that does not dissolve the resin contained in coating slip is used, the porous film or the support on which a coated film has been formed by application of the coating slip is immersed in the solvent X, the solvent (dispersion medium) contained in the coated film formed on the porous film or the support is replaced with the solvent X, and thereafter the solvent X is evaporated. This method makes it possible to efficiently remove the solvent (dispersion medium) from the coating slip. Assume that heating is carried out so as to remove the solvent (dispersion medium) or the solvent X from the coated film of the coating slip which coated film has been formed on the porous film or the support. In this case, in order to prevent the porous film from having a lower air permeability due to contraction of the pores of the porous film, it is desirable to carry out heating at a temperature at which the porous film does not have a lower air permeability, specifically, 10° C. to 120° C. and more preferably 20° C. to 80° C.

According to the present embodiment, the solvent (dispersion medium) is particularly preferably removed by applying the coating slip to the base material and thereafter forming the porous layer by drying the coating slip. The arrangement allows a porous layer which has a porosity whose degree of variability is small and which is less wrinkled.

It is possible to use a normal drying device for the drying.

The porous layer in accordance with the present invention which porous layer is formed by the method described earlier only needs to have a thickness that is appropriately determined in view of the thickness of the laminate. In a case where the porous film is used as the base material to form the laminate by laminating the porous layer to one side or both sides of the porous film, the porous layer has, per one side thereof, a thickness preferably of 0.5 µm to 15 µm and more preferably of 2 µm to 10 µm.

The porous layer whose both sides have a thickness of less than 1 µm in total makes it impossible to sufficiently prevent an internal short circuit due to, for example, breakage of a non-aqueous electrolyte secondary battery as which a laminate is used. In addition, the porous film whose both sides have a thickness of less than 1 µm in total causes the porous layer to retain an electrolyte in a lower amount. Meanwhile, the porous film whose both sides have a thickness of more than 30 µm in total causes an increase in permeation resistance of lithium ions in the entire non-aqueous electrolyte secondary battery separator as which the laminate is used. Thus, repeated cycles cause a deterioration in cathode of the non-aqueous electrolyte secondary battery and consequently cause a deterioration in rate characteristic and/or cycle characteristic. Further, the porous film whose both sides have a thickness of more than 30 µm in total causes a longer distance between the cathode and the anode of the non-aqueous electrolyte secondary battery, so that the non-aqueous electrolyte secondary battery is made larger.

In a case where the porous layer is laminated to both sides of the porous film, physical properties of the porous layer which are described below at least refer to physical properties of the porous layer which is laminated to the surface of the porous film which surface faces the cathode of the porous film which is used as the non-aqueous electrolyte secondary battery.

The porous layer only needs to have, per one side thereof, a weight per unit area which weight is appropriately determined in view of a strength, a thickness, a weight, and handleability of the laminate. In a case where the laminate is used as the non-aqueous electrolyte secondary battery separator, the porous layer normally has a weight per unit area preferably of 1 g/m$^2$ to 20 g/m$^2$ and more preferably of 4 g/m$^2$ to 10 g/m$^2$. The porous layer which has a weight per unit area which weight falls within such a numerical range allows an increase in weight energy density or volume energy density of the non-aqueous electrolyte secondary battery including the porous layer. The porous layer which has a weight per unit area which weight is beyond the numerical range causes the non-aqueous electrolyte secondary battery separator to be heavy in a case where the laminate is used as the non-aqueous electrolyte secondary battery separator.

Further, the porous layer contains, per square meter thereof, a porous layer component having, per one side of the porous layer, a volume preferably of 0.5 cm$^3$ to 20 cm$^3$, more preferably of 1 cm$^3$ to 10 cm$^3$, and still more preferably of 2 cm$^3$ to 8 cm$^3$. That is, the porous layer has, per one side thereof, a component volume weight per unit area preferably of 0.5 cm$^3$/m$^2$ to 20 cm$^3$/m$^2$, more preferably of 1 cm$^3$/m$^2$ to 10 cm$^3$/m$^2$, and still more preferably of 2 cm$^3$/m$^2$ to 8 cm$^3$/m$^2$. The porous layer which has a component volume weight per unit area of less than 0.5 cm$^3$/m$^2$ makes it impossible to sufficiently prevent an internal short circuit due to, for example, breakage of the non-aqueous electrolyte secondary battery as which the laminate is used. Meanwhile, the porous layer which has a component volume weight per unit area of more than 20 cm$^3$/m$^2$ causes an increase in permeation resistance of lithium ions in the entire non-aqueous electrolyte secondary battery separator as which the laminate is used. Thus, repeated cycles cause a deterioration in cathode of the non-aqueous electrolyte secondary battery and consequently cause a deterioration in rate characteristic and/or cycle characteristic of the non-aqueous electrolyte secondary battery. Note that a method for calculating the component volume weight per unit area of the porous layer is described later.

In order to obtain sufficient ion permeability, the porous layer has a porosity preferably of 20% by volume to 90% by volume and more preferably of 30% by volume to 80% by volume. The porous layer has pores having a pore size preferably of not more than 3 µm and more preferably of not more than 1 µm. In a case where the laminate including the porous layer in which the pore size is thus set is used as the non-aqueous electrolyte secondary battery separator, it is possible to obtain sufficient ion permeability.

"A displacement, during a period from when a dielectric breakdown occurs in the laminate to when the laminate is brought into electrical conduction, in a thickness direction of the laminate in an electrical conduction test by nail penetration in which test the displacement is measured by use of a nail of N50 specified in JIS A 5508 and under a condition in which the nail descends at a descending speed of 50 µm/min" of the laminate of the present invention is a numerical value measured by the following method.

First, a measuring apparatus for use in an electrical conduction test by nail penetration is described below with reference to FIG. 1.

As illustrated in FIG. 1, the measuring apparatus for use in the electrical conduction test by nail penetration, i.e., a measuring apparatus for measuring a displacement in the thickness direction of the laminate mainly includes: a SUS plate 1 (SUS304; having a thickness of 1 mm) serving as a base on which to place a laminate 10 to be measured; a driving section (not illustrated) for holding a nail 2 of N50 specified in JIS A 5508 and vertically moving the held nail 2 at a constant speed; a resistance measuring device 3 for measuring a direct current resistance between the nail 2 and the SUS plate 1; and a material testing machine (not illustrated) for measuring a deformation amount in a thickness direction of the laminate 10 and a force required for deformation. The SUS plate 1, which only needs to have a larger size than at least the laminate 10, is not particularly limited in size. The driving section, which is provided above the SUS plate 1, holds the nail 2 so that a tip of the nail 2 is perpendicular to a surface of the SUS plate 1, and vertically moves the held nail 2. It is only necessary to use a commercial item such as Digital Multimeter 7461P (manufactured by ADC CORPORATION) as the resistance measuring device 3. It is also only necessary to use a commercial item as the material testing machine. Note that it is also possible to arrange the measuring apparatus by using Compact Table-Top Universal Tester EZ-L (manufactured by SHIMADZU CORPORATION) for the measuring apparatus and connecting each of the resistance measuring device and the material testing machine to this tester.

The following description discusses a method for measuring a displacement in the thickness direction of the laminate 10 by use of the measuring apparatus.

First, the nail 2 is fixed, by use of a drill chuck fixture, to a load cell provided in a crosshead of the driving section of the material testing machine. Further, a fixing base is placed on a surface of a lower part of the material testing machine to which surface the fixture is attached, an anode sheet 4 serving as an anode of a non-aqueous electrolyte secondary battery is placed on the SUS plate 1 located on the fixing base, and the laminate 10 is placed on the anode sheet 4. A deformation amount in the thickness direction of the laminate 10 is measured by use of a stroke of the crosshead of the material testing machine, and a force required for deformation is measured by use of the load cell to which the nail 2 is fixed. Then, the nail 2 and the resistance measuring device 3 are electrically connected, and the SUS plate 1 and the resistance measuring device 3 are electrically connected. Note that such an electrical connection only needs to be carried out by use of, for example, an electric cord and a crocodile clip.

The anode sheet 4 used in the measurement can be prepared by the following method. That is, 100 parts by weight of an aqueous solution of carboxymethyl cellulose, which aqueous solution has a concentration of carboxymethyl cellulose of 1% by weight and serves as a thickener and a binding agent, and 2 parts by weight of an aqueous emulsion of styrene-butadiene rubber, which aqueous emulsion has a concentration of styrene-butadiene rubber of 50% by weight, are added to and mixed with 98 parts by weight of graphite powder serving as an anode active material. Then, 22 parts by weight of water is further added to the resulting solution so as to prepare a slurry having a solid content concentration of 45% by weight. The slurry thus obtained is applied to a part of rolled copper foil serving as an anode current collector and having a thickness of 20 μm, and the slurry is dried so that the slurry has a basis weight of 140 g/m². Thereafter, the rolled copper foil is rolled by use of a pressing machine to have a thickness of 120 μm (an anode active material layer has a thickness of 100 μm). Next, the rolled copper foil thus rolled is cut so that a part of the rolled copper foil in which part the anode active material layer is provided has a size of 20 mm×20 mm. The anode sheet 4 for the electrical conduction test by nail penetration is thus prepared.

Next, the driving section is driven to cause the nail 2 to descend and then to bring the tip of the nail 2 into contact with a surface (uppermost layer) of the laminate 10 so as to stop the nail 2 (preparation for the measurement has been completed). Then, a state in which the tip of the nail 2 is in contact with the surface of the laminate 10 is regarded as a displacement in the thickness direction of the laminate 10 of "0".

After preparation for the measurement has been completed, the driving section is driven to start causing the nail 2 to descend at a descending speed of 50 μm/min. Simultaneously with this, (1) a deformation amount in the thickness direction of the laminate 10 and a force required for deformation are measured by use of the material testing machine, and (2) a direct current resistance between the nail 2 and the SUS plate 1 is measured by use of the resistance measuring device 3. After the start of the measurement, a point in time at which the direct current resistance reaches 10,000Ω first is regarded as a dielectric breakdown point, and a point in time at which the direct current resistance reaches 100Ω is regarded as an electrical conduction point. Then, a displacement (unit: μm) in the thickness direction of the laminate 10 during a period from when a dielectric breakdown occurs in the laminate 10 to when the laminate 10 is brought into electrical conduction is measured (calculated) by subtracting a deformation amount in the thickness direction of the laminate 10 at the dielectric breakdown point from a deformation amount in the thickness direction of the laminate 10 at the electrical conduction point.

Note that the anode active material layer of the anode sheet is set to have a thickness that is larger by not less than 20 μm than a displacement in the thickness direction which displacement is to be measured. That is, as a result of measurement of a displacement in the thickness direction, in a case where the measured displacement in the thickness direction and the thickness of the anode active material layer of the anode sheet have a difference therebetween by less than 20 μm, a displacement in the thickness direction is measured again by use of an anode sheet that includes a thicker anode active material layer. For example, in a case where the slurry is applied to a part of rolled copper foil having a thickness of 20 μm, the slurry is dried so that the slurry has a basis weight of 420 g/m², and thereafter the rolled copper foil is rolled by use of a pressing machine to have a thickness of 320 μm, it is possible to obtain an anode sheet that includes an anode active material layer having a thickness of 300 μm. In a case where the displacement in the thickness direction is more than 80 μm, it is only necessary to use such an anode sheet instead of the anode sheet that includes the anode active material layer having a thickness of 100 μm (described earlier).

In an electrical conduction test by nail penetration in which test a displacement in a thickness direction of the laminate during a period from when a dielectric breakdown occurs in the laminate to when the laminate is brought into electrical conduction is measured by use of a nail of N50 specified in JIS A 5508 and under a condition in which the nail descends at a descending speed of 50 μm/min, the displacement is preferably not less than 20 μm and not more than 200 μm, more preferably not less than 20 μm and not more than 160 μm, still more preferably not less than 20 μm and not more than 80 μm, and particularly preferably not less than 30 μm and not more than 80 μm.

In a case where the displacement is not less than 20 μm and not more than 200 μm and the laminate is used as the non-aqueous electrolyte secondary battery separator, a high level of safety can be ensured by preventing an internal short circuit due to, for example, breakage of a non-aqueous electrolyte secondary battery while maintaining various performance capabilities such as a rate characteristic and a resistance characteristic of the non-aqueous electrolyte secondary battery.

In a case where the displacement is less than 20 μm and the laminate is used as the non-aqueous electrolyte secondary battery separator, it is impossible to sufficiently prevent an internal short circuit due to, for example, breakage of the non-aqueous electrolyte secondary battery. Meanwhile, in a case where the displacement is more than 200 μm and the laminate is used as the non-aqueous electrolyte secondary battery separator, lithium ions have a higher permeation resistance in the entire non-aqueous electrolyte secondary battery separator. Thus, repeated cycles cause a deterioration in cathode of the non-aqueous electrolyte secondary battery and consequently cause a deterioration in rate characteristic and/or cycle characteristic.

Note that a displacement in the thickness direction of the laminate during a period from when a dielectric breakdown occurs in the porous layer to when the porous layer is brought into electrical conduction can be calculated by subtracting a displacement in the thickness direction of the laminate during a period from when a dielectric breakdown occurs in the porous film to when the porous film is brought into electrical conduction from a displacement in the thickness direction of the laminate during a period from when a dielectric breakdown occurs in the laminate to when the laminate is brought into electrical conduction. The displacement in the thickness direction of the laminate during the period from when a dielectric breakdown occurs in the porous layer to when the porous layer is brought into electrical conduction is preferably not less than 10 μm and not more than 190 μm, more preferably not less than 10 μm and not more than 150 μm, still more preferably not less than 20 μm and not more than 150 μm, and particularly preferably not less than 20 μm and not more than 80 μm.

<Laminate>

The laminate in accordance with the present invention is formed by laminating the porous layer to one side or both sides of the porous film by the method described earlier. That is, the laminate in accordance with the present invention is arranged such that the porous layer is laminated to one side or both sides of the porous film.

The laminate has an air permeability of a Gurley value preferably of 30 sec/100 mL to 1000 sec/100 mL and more preferably of 50 sec/100 mL to 800 sec/100 mL. The laminate which has an air permeability falling within the above range makes it possible to obtain sufficient ion permeability in a case where the laminate is used as the non-aqueous electrolyte secondary battery separator. Meanwhile, the laminate which has an air permeability beyond the above range means that the laminate has a coarse laminated structure due to a high porosity thereof. This causes the laminate to have a lower strength, so that the laminate may be insufficient in shape stability (particularly shape stability at a high temperature). In contrast, the laminate which has an air permeability falling below the above range makes it impossible to obtain sufficient ion permeability in a case where the laminate is used as the non-aqueous electrolyte secondary battery separator. This may cause the non-aqueous electrolyte secondary battery to have a lower battery characteristic.

Note that the laminate in accordance with the present invention may appropriately include a publicly-known porous membrane(s) such as a heat-resistant layer, an adhesion layer, and/or a protective layer in addition to the porous film and the porous layer, provided that such a porous membrane does not impair the object of the present invention.

<Non-Aqueous Electrolyte Secondary Battery>

A non-aqueous electrolyte secondary battery in accordance with the present invention includes the laminate as the non-aqueous electrolyte secondary battery separator. More specifically, the non-aqueous electrolyte secondary battery in accordance with the present invention includes a non-aqueous electrolyte secondary battery member in which a cathode, the laminate, and an anode are provided in this order. The following description takes a lithium ion secondary battery as an example of the non-aqueous electrolyte secondary battery. Note that components of the non-aqueous electrolyte secondary battery other than the laminate are not limited to those discussed in the following description.

In the non-aqueous electrolyte secondary battery in accordance with the present invention, it is possible to use, for example, a non-aqueous electrolyte obtained by dissolving lithium salt in an organic solvent. Examples of the lithium salt include: $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, $LiAlCl_4$, and the like. The above lithium salts may be used in only one kind or in combination of two or more kinds. Of the above lithium salts, at least one kind of fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$ is more preferable.

Specific examples of the organic solvent of the non-aqueous electrolyte include: carbonates such as ethylene carbonate, propylene carbonate, dimethyl carbonate, diethyl carbonate, ethylmethyl carbonate, 4-trifluoromethyl-1,3-dioxolane-2-on, and 1,2-di(methoxycarbonyloxy)ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethylsulfoxide, and 1,3-propanesultone; a fluorine-containing organic solvent obtained by introducing a fluorine group in the organic solvent; and the like. The above organic solvents may be used in only one kind or in combination of two or more kinds. Of the above organic solvents, a carbonate is more preferable, and a mixed solvent of cyclic carbonate and acyclic carbonate or a mixed solvent of cyclic carbonate and an ether is more preferable. The mixed solvent of cyclic carbonate and acyclic carbonate is more preferably exemplified by a mixed solvent containing ethylene carbonate, dimethyl carbonate, and ethylmethyl carbonate. This is because the mixed solvent containing ethylene carbonate, dimethyl carbonate, and ethylmethyl carbonate operates in a wide temperature range, and is refractory also in a case where a graphite material such as natural graphite or artificial graphite is used as an anode active material.

Normally, a sheet cathode in which a cathode current collector supports a cathode mixture containing a cathode active material, an electrically conductive material, and a binding agent is used as the cathode.

Examples of the cathode active material include a material that is capable of doping and undoping lithium ions. Examples of the material include lithium complex oxides each containing at least one kind of transition metal selected from the group consisting of V, Mn, Fe, Co, and Ni. Of the above lithium complex oxides, lithium complex oxides each having an α-$NaFeO_2$ structure such as lithium nickel oxide and lithium cobalt oxide, and lithium complex oxides each having a spinel structure such as lithium manganate spinel are more preferable. This is because these lithium complex oxides are each high in average discharge potential. These lithium complex oxides each may contain various metallic elements, and lithium nickel complex oxide is more preferable. Further, it is particularly preferable to use lithium nickel complex oxide which contains at least one kind of metallic element so that the at least one kind of metallic element accounts for 0.1 mol % to 20 mol % of a sum of the number of moles of the at least one kind of metallic element and the number of moles of Ni in lithium nickel oxide, the at least one kind of metallic element being selected from the group consisting of Ti, V, Cr, Mn, Fe, Co, Cu, Ag, Mg, Al, Ga, In, and Sn. This is because such lithium nickel complex oxide is excellent in cycle characteristic during use of the non-aqueous electrolyte secondary battery at a high volume.

Examples of the electrically conductive material include carbonaceous materials such as natural graphite, artificial graphite, cokes, carbon black, pyrolytic carbons, carbon fiber, organic high molecular compound baked bodies, and the like. The above electrically conductive materials may be used in only one kind. Alternatively, the above electrically conductive materials may be used in combination of two or more kinds by, for example, mixed use of artificial graphite and carbon black.

Examples of the binding agent include polyvinylidene difluoride, a vinylidene fluoride copolymer, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene-tetrafluoroethylene copolymer, and thermoplastic resins such as thermoplastic polyimide, polyethylene, and polypropylene. Note that the binding agent also functions as a thickener.

For example, the cathode mixture can be obtained by pressing the cathode active material, the electrically conductive material, and the binding agent on the cathode current collector; or by causing the cathode active material, the electrically conductive material, and the binding agent to be pasty by use of an appropriate organic solvent.

Examples of the cathode current collector include electrically conductive materials such as Al, Ni, and stainless steel, and Al, which is easy to process into a thin film and less expensive, is more preferable.

Examples of a method for producing the sheet cathode, i.e., a method for causing the cathode current collector to support the cathode mixture include: (1) a method in which the cathode active material, the electrically conductive material, and the binding agent which are to be formed into the cathode mixture are pressure-molded on the cathode current collector; (2) a method in which the cathode mixture which has been obtained by causing the cathode active material, the electrically conductive material, and the binding agent to be pasty by use of an appropriate organic solvent is applied to the cathode current collector, and a sheet cathode mixture obtained by drying is pressed so as to be closely fixed to the cathode current collector; and the like.

Normally, a sheet anode in which an anode current collector supports an anode mixture containing an anode active material is used as the anode.

Examples of the anode active material include a material that is capable of doping and undoping lithium ions, lithium metal or lithium alloy, and the like. Specific examples of such a material include: carbonaceous materials such as natural graphite, artificial graphite, cokes, carbon black, pyrolytic carbons, carbon fiber, and organic high molecular compound baked bodies; and chalcogen compounds such as oxides and sulfides each doping and undoping lithium ions at a lower potential than that of the cathode. Of the above anode active materials, a carbonaceous material which contains, as a main component, a graphite material such as natural graphite or artificial graphite is more preferable. This is because such a carbonaceous material is high in potential evenness, and a great energy density can be obtained in a case where the carbonaceous material, which is low in average discharge potential, is combined with the cathode.

For example, the anode mixture can be obtained by pressing the anode active material on the anode current collector; or by causing the anode active material to be pasty by use of an appropriate organic solvent.

Examples of the anode current collector include Cu, Ni, stainless steel, and the like, and Cu is particularly preferable. This is because Cu is difficult to alloy with lithium in a lithium ion secondary battery and easy to process into a thin film.

Examples of a method for producing the sheet anode, i.e., a method for causing the anode current collector to support the anode mixture include: (1) a method in which the anode active material to be formed into the anode mixture are pressure-molded on the anode current collector; (2) a method in which the anode mixture which has been obtained by causing the anode active material to be pasty by use of an appropriate organic solvent is applied to the anode current collector, and a sheet anode mixture obtained by drying is pressed so as to be closely fixed to the anode current collector; and the like.

The non-aqueous electrolyte secondary battery member is formed by providing the cathode, the laminate, and the anode in this order. Thereafter, the non-aqueous electrolyte secondary battery member is placed in a container serving as a housing of the non-aqueous electrolyte secondary battery. Subsequently, the container is filled with a non-aqueous electrolyte, and then the container is sealed while being decompressed. The non-aqueous electrolyte secondary battery in accordance with the present invention can thus be produced. The non-aqueous electrolyte secondary battery, which is not particularly limited in shape, may have any shape such as a sheet (paper) shape, a disc shape, a cylindrical shape, or a prismatic shape such as a rectangular prismatic shape. Note that it is possible to employ a conventionally publicly-known production method as a method for producing the non-aqueous electrolyte secondary battery, which method is not particularly limited.

A non-aqueous electrolyte secondary battery in accordance with the present invention includes, as a non-aqueous electrolyte secondary battery separator, a laminate including: a porous film containing polyolefin as a main component; and a porous layer containing fine particles; the porous layer being laminated to at least one side of the porous film, in an electrical conduction test by nail penetration in which test a displacement in a thickness direction of the laminate during a period from when a dielectric breakdown occurs in the laminate to when the laminate is brought into electrical conduction is measured by use of a nail of N50 specified in JIS A 5508 and under a condition in which the nail descends at a descending speed of 50 µm/min, the displacement being not less than 20 µm and not more than 200 µm. Thus, the non-aqueous electrolyte secondary battery in accordance with the present invention prevents an internal short circuit due to, for example, breakage of a non-aqueous electrolyte secondary battery while maintaining various performance capabilities such as a rate characteristic and a resistance characteristic (solution resistance) of the non-aqueous electrolyte secondary battery (occurrence of the internal short circuit counters the maintenance of the various performance capabilities). This makes it possible to ensure a high level of safety.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

EXAMPLES

The following description more specifically describes the present invention with reference to Examples and Comparative Examples. However, the present invention is not limited by the Examples.

Physical properties and the like of a laminated porous film (laminate), an A layer (porous film), and a B layer (porous layer) were measured by the following methods.

(1) Thickness (Unit: µm):

A thickness of the laminated porous film (i.e., an entire thickness), a thickness of the A layer, and a thickness of the B layer were measured by use of High-Accuracy Digital Micrometer manufactured by Mitutoyo Corporation.

(2) Weight Per Unit Area (Unit: $g/m^2$):

A square with one side 8 cm in length was cut off, as a sample, from the laminated porous film, and a weight W (g) of the sample was measured. Then, a weight per unit area of the laminated porous film (i.e., an entire weight per unit area) was calculated based on the following equation:

Weight per unit area $(g/m^2) = W/(0.08 \times 0.08)$

Similarly, a weight per unit area of the A layer was calculated. A weight per unit area of the B layer was calculated by subtracting the weight per unit area of the A layer from the entire weight per unit area.

(3) Component Volume Weight Per Unit Area (Unit: $cm^3/m^2$) of B Layer (Porous Layer):

Respective weight per unit areas of components of the B layer were calculated by multiplying the weight per unit area of the B layer calculated by the above method (2) by respective weight concentrations of the components of the B layer (a weight concentration in the B layer). Then, the respective weight per unit areas of the components thus calculated were divided by respective true specific gravities of the components, and a sum of obtained numerical values was regarded as a component volume weight per unit area of the B layer.

Specifically, in a case where the components of the B layer are three components (components C to E), the component volume weight per unit area of the B layer is calculated based on the following equation:

Component volume weight per unit area $(cm^3/m^2)$ of B layer=$Wb \times Xc/\rho c + Wb \times Xd/\rho d + Wb \times Xe/\rho e$ where Wb $(g/m^2)$ is the weight per unit area of the B layer; Xc (% by weight) is a weight concentration of the component C; Xd (% by weight) is a weight concentration of the component D; Xe (% by weight) is a weight concentration of the component E; $\rho c$ $(g/cm^3)$ is a true specific gravity of the component C; $\rho d$ $(g/cm^3)$ is a true specific gravity of the component D; and $\rho e$ $(g/cm^3)$ is a true specific gravity of the component E, where Xc+Xd+Xe=100 (% by weight).

(4) Displacement in Thickness Direction of Laminate (Unit: μm):

A displacement in a thickness direction of the laminate was measured by use of the electrical conduction test by nail penetration (described earlier).

Example 1

The following A layer (porous film) and the following B layer (porous layer) were used to form a laminated porous film (laminate) 1.

<A Layer>

Polyethylene serving as polyolefin was used to prepare the porous film 1 serving as a base material.

That is, 70 parts by weight of ultrahigh molecular weight polyethylene powder (340M, manufactured by Mitsui Chemicals, Inc.) and 30 parts by weight of polyethylene wax (FNP-0115, manufactured by NIPPON SEIRO CO., LTD.) having a weight average molecular weight of 1000 were mixed to obtain mixed polyethylene. To 100 parts by weight of the obtained mixed polyethylene, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added, and calcium carbonate (manufactured by MARUO CALCIUM CO., LTD.) having an average particle size of 0.1 μm was further added so as to account for 38% by volume of a total volume of the resulting mixture. The resulting composition, which was in the form of powder, was mixed in Henschel Mixer as it was, and thereafter the composition was melt-kneaded by use of a double-screw kneader. A polyethylene resin composition was thus obtained. Next, the polyethylene resin composition was rolled by use of a pair of rolls having a surface temperature set at 150° C., so that a sheet was prepared. The sheet was immersed in an aqueous hydrochloric solution (in which 4 mol/L of hydrochloric acid and 0.5% by weight of a non-ionic surfactant were blended), so that calcium carbonate was removed by being dissolved in the aqueous hydrochloric solution. Subsequently, the sheet was drawn to six times at 105° C., so that the porous film (A layer) made of polyethylene was prepared.

<B Layer>

Sodium carboxymethyl cellulose (CMC) (manufactured by Daicel Corporation; CMC1110) was used as a binder resin. Mica (manufactured by Wako Pure Chemical Industries, Ltd.; non-swelling isinglass) was used as inorganic fine particles. Note that the mica is fine particles having cleavability.

The mica, CMC and a solvent (mixed solvent of water and isopropyl alcohol) were mixed together in the ratio below. That is, 3 parts by weight of CMC was mixed with 100 parts by weight of the mica, and the solvent was mixed with the resulting mixture so that a mixed solution to be obtained had a solid content (mica+CMC) concentration of 27.7% by weight and the solvent had a composition of 95% by weight of water and 5% by weight of isopropyl alcohol. A dispersion liquid of mica was thus obtained. Then, the obtained dispersion liquid was high-pressure dispersed (under a condition of 100 MPa×3 passes) by use of a high-pressure dispersing device (manufactured by Sugino Machine Limited; Star Burst), so that a coating slip 1 was prepared.

<Laminated Porous Film>

A corona treatment was carried out with respect to one side of the A layer at 20 W/$(m^2/min)$. Next, a surface of the A layer which surface had been subjected to the corona treatment was coated with the coating slip 1 by use of a gravure coater. In this case, in order that the A layer was uniformly coated with the coating slip 1, a tension was applied to the A layer while a coated place in the A layer was sandwiched between pinch rolls on both sides thereof. Thereafter, the B layer was formed by drying a coated film. The laminated porous film 1 in which the B layer was laminated to one side of the A layer was thus obtained.

<Evaluation of Physical Properties>

Physical properties and the like of the obtained laminated porous film 1 were measured by the method described earlier. Table 1 shows a result of the measurement.

<Preparation of Non-Aqueous Electrolyte Secondary Battery>

<<Preparation of Laminate-Type Non-Aqueous Electrolyte Secondary Battery>>

(Preparation of Cathode)

Six parts by weight of acetylene black and 4 parts by weight of polyvinylidene difluoride (manufactured by KUREHA CORPORATION) were added to and mixed with 90 parts by weight of $LiNi_{1/3}Mn_{1/3}Co_{1/3}O_2$ serving as a cathode active material, so that a mixture was obtained. The mixture thus obtained was dispersed in N-methyl-2-pyrrolidone, so that a slurry was prepared. The slurry thus obtained was uniformly applied to a part of aluminum foil serving as a cathode current collector, and the slurry was dried. Thereafter, the aluminum foil was rolled by use of a pressing machine so as to have a thickness of 80 μm. Next, the rolled aluminum foil was cut off to be a cathode so that a part in which no cathode active material layer was provided and which had a width of 13 mm was left around a part in which a cathode active material layer was provided and which had a size of 40 mm×35 mm. The cathode active material layer had a density of 2.50 $g/cm^3$.

(Preparation of Anode)

One hundred parts by weight of an aqueous solution of carboxymethyl cellulose, which aqueous solution has a concentration of carboxymethyl cellulose of 1% by weight and serves as a thickener and a binding agent, and 1 parts by weight of an aqueous emulsion of styrene-butadiene rubber were added to and mixed with 98 parts by weight of graphite powder serving as an anode active material, so that a slurry was prepared. The slurry thus obtained was applied to a part of rolled aluminum foil serving as an anode current collector and having a thickness of 20 µm, and the slurry was dried. Thereafter, the rolled aluminum foil was rolled by use of a pressing machine so as to have a thickness of 80 µm. Next, the rolled aluminum foil thus rolled was cut off to be an anode so that a part in which no anode active material layer was provided and which had a width of 13 mm was left around a part in which an anode active material layer was provided and which had a size of 50 mm×40 mm. The anode active material layer had a density of 1.40 g/cm$^3$.

(Preparation of Laminate-Type Non-Aqueous Electrolyte Secondary Battery)

The cathode, the laminated porous film 1, and the anode were laminated (placed) in this order in a laminate pouch so that the B layer of the laminated porous film 1 and the cathode active material layer of the cathode were in contact with each other and the A layer of the laminated porous film 1 and the anode active material layer of the anode were in contact with each other. A laminate-type non-aqueous electrolyte secondary battery member was thus obtained. In this case, the cathode and the anode were placed so that a principal surface of the cathode in the cathode active material layer was entirely included in a range of (overlapped with) a principal surface of the anode in the anode active material layer. Note that the laminated porous film 1 had a greater size than the anode.

Subsequently, the laminate-type non-aqueous electrolyte secondary battery member was placed in a bag in which an aluminum layer and a heat sealing layer and were laminated, and 0.25 mL of a non-aqueous electrolyte was further placed in the bag. The non-aqueous electrolyte was prepared by dissolving, in a mixed solvent in which ethylenecarbonate, ethylmethylcarbonate, and diethylcarbonate were mixed in a volume ratio of 3:5:2, LiPF$_6$ so that the non-aqueous electrolyte had a concentration of LiPF$_6$ of 1 mol/L. Then, the bag was heat-sealed while being decompressed, so that a laminate-type non-aqueous electrolyte secondary battery was prepared.

<Calculation of Solution Resistance of Laminate-Type Non-Aqueous Electrolyte Secondary Battery>

The laminate-type non-aqueous electrolyte secondary battery was subjected to four cycles of initial charge and discharge assuming that one cycle of charge and discharge was carried out at a temperature of 25° C., in a voltage range set at 4.1 V to 2.7 V, and at a current value set at 0.2 C (note that a current value 1 C refers to a current value at which a rated capacity derived from a one hour rate discharged capacity is discharged in one hour and same applies to the following description).

Subsequently, an alternating-current impedance was measured by using CHEMICAL IMPEDANCE METER (manufactured by HIOKI E.E. CORPORATION; 3532-80) and applying an alternating-current signal having an amplitude of 10 mV to the laminate-type non-aqueous electrolyte secondary battery at 25° C., so that Nyquist diagram was prepared. Note here that the Nyquist diagram is a diagram in which an effective component (x-axis component) and an imaginary component (y-axis component) of the alternating-current impedance are shown on a complex plane. Then, a value of the effective component (=an intercept of the x-axis) at which value the imaginary component on the diagram is zero (Y=0) was calculated from the Nyquist diagram, so that the value was set as a solution resistance (unit: Ω) of the laminate-type non-aqueous electrolyte secondary battery. Table 2 shows a result of the calculation.

<<Preparation of Cylindrical Non-Aqueous Electrolyte Secondary Battery>>

(Preparation of Cathode)

(i) LiCoO$_2$ as a cathode active material (CELLSEED C-10N, manufactured by NIPPON CHEMICAL INDUSTRIAL CO., LTD. and having a true specific gravity of 4.8 g/cm$^3$); (ii) acetylene black as an electrically conductive agent (manufactured by DENKI KAGAKU KOGYO KABUSHIKI KAISHA and having a true specific gravity of 2.2 g/cm$^3$); (iii) a binder resin 1 (PTFE31-JR, manufactured by Du Pont-Mitsui Fluorochemicals Company, Ltd. and having a true specific gravity of 2.2 g/cm$^3$); and (iv) a binder resin 2 (CELLOGEN 4H, manufactured by DKS Co. Ltd. and having a true specific gravity of 1.4 g/cm$^3$) were used, and these components were weighed so as to be in a weight ratio (composition) of 92:2.7:4.55:0.75 in this order. Then, a certain amount of water was placed in a kneader so as to dissolve the binder resin 2 in the water. Thereafter, the resulting solution, to which the cathode active material, the electrically conductive agent, and the binder resin 1 were added, was kneaded. Next, a kneaded product, to which an appropriate amount of water was added, was adjusted to have a viscosity of 2700±1000 cp at 25° C., so that a cathode mixture was obtained. The cathode mixture was uniformly applied to a predetermined part on both sides of aluminum foil serving as a cathode current collector, having no pores, and having a thickness of 20 µm, and the cathode mixture was dried. Thereafter, a dried product was rolled by use of a roll pressing machine until a coated film (the cathode mixture) had a thickness of 140 µm (an apparent density of 3.5 g/cm$^3$). Next, the rolled aluminum foil was cut off, so that a cathode having a width of 54 mm and a length of 560 mm was obtained.

(Preparation of Anode)

(i) An anode active material 1 (BF15SP, manufactured by Chuetsu Graphite Works Co., Ltd. and having a true specific gravity of 2.2 g/cm$^3$); (ii) an anode active material 2 (CG-R-A, manufactured by Nippon Graphite Industries, Co., Ltd. and having a true specific gravity of 2.2 g/cm$^3$); and (iii) a binder resin (CELLOGEN 4H, manufactured by DKS Co. Ltd. and having a true specific gravity of 1.4 g/cm$^3$) were used, and these components were weighed so as to be in a weight ratio (composition) of 58.8:39.2:2 in this order. Then, a certain amount of water was placed in a kneader so as to dissolve the binder resin in the water. Thereafter, the resulting solution, to which the anode active material 1 and the anode active material 2 were added, was kneaded. Next, a kneaded product, to which an appropriate amount of water was added, was adjusted to have a viscosity of 2100±500 cp at 25° C., so that an anode mixture was obtained. The anode mixture was uniformly applied to a predetermined part on both sides of copper foil serving as an anode current collector, having no pores, and having a thickness of 12 µm, and the anode mixture was dried. Thereafter, a dried product was rolled by use of a roll pressing machine until a coated film (the anode mixture) had a thickness of 140 µm (an apparent density of 1.45 g/cm$^3$). Next, the rolled copper foil was cut off, so that an anode having a width of 56 mm and a length of 600 mm was obtained.

(Preparation of Cylindrical Non-Aqueous Electrolyte Secondary Battery)

The laminated porous film 1 having a width of 60 mm and a length of 700 mm was used as the laminate. A cathode tab made of aluminum was welded to the cathode, and an anode tab made of nickel was welded to the anode. Then, as in the case of the preparation of the laminate-type non-aqueous electrolyte secondary battery (described earlier), the cathode, the laminated porous film 1, and the anode were laminated (placed) in this order and wound, so that a cylindrical non-aqueous electrolyte secondary battery member was obtained.

Subsequently, the cylindrical non-aqueous electrolyte secondary battery member was necked on a bench lathe while being placed in a battery can for a 18650 cylindrical battery. Then, after the anode tab was welded to a bottom of the battery can and the cathode tab was welded to a lid, vacuum drying was carried out. Thereafter, 5 g (equivalent to 1.1 times a total volume of pores in the cathode, the laminated porous film 1, and the anode) of a non-aqueous electrolyte was placed in the battery can in a glove box in an atmosphere of argon gas. As the non-aqueous electrolyte, a commercial item (manufactured by KISHIDA CHEMICAL Co., Ltd. and having a specific gravity of 1.21 g/cm$^3$) in which 1.3 mol/L of $LiPF_6$ was contained in a carbonate solvent was used. Then, the battery can and the lid were swaged together, so that the cylindrical non-aqueous electrolyte secondary battery (18650 cylindrical battery) was prepared.

<Calculation of 50% Breakdown Voltage of Cylindrical Non-Aqueous Electrolyte Secondary Battery (Nail Penetration Test)>

After the cylindrical non-aqueous electrolyte secondary battery was charged to a predetermined test voltage, a nail penetration test in which a central part of the cylindrical non-aqueous electrolyte secondary battery was penetrated by being pierced with a nail with a diameter of 2.77 mm at a descending speed of 1 mm/sec was carried out so as to evaluate safety of the cylindrical non-aqueous electrolyte secondary battery (determine whether the cylindrical non-aqueous electrolyte secondary battery was good or poor).

Safety of the cylindrical non-aqueous electrolyte secondary battery at the test voltage was evaluated in accordance with the following criteria:

Good: Heat generation or smoke generation occurs, but the battery can and the lid are not damaged.

Poor: Explosion or ignition occurs, or the lid is blown away.

Then, the nail penetration test was started by setting an initial test voltage at any voltage between 3.8 V and 4.2 V. In the case of "Good", a similar test was carried out by raising the test voltage by 0.05 V. In the case of "Poor", a similar test was carried out by lowering the test voltage by 0.05 V. The nail penetration test was carried out at a single test voltage with respect to 10 or more cylindrical non-aqueous electrolyte secondary batteries in total.

By using a result of this test and following a method described in "JIS K 7211 general rules for determination of falling weight impact behavior of rigid plastics", a 50% breakdown voltage (unit: V) was calculated as below. Table 2 shows a result of the calculation.

The 50% breakdown voltage (unit: V) was calculated based on the following equation:

$$V50 = VI + d[\Sigma(i \times ni)/N \pm \tfrac{1}{2}]$$

where V50 is the 50% breakdown voltage (unit: V); VI is the test voltage in a case where a voltage level (i) is 0 (the test voltage in which "Good" and "Poor" coexist and "Poor" is higher in number) (unit: V); i is a voltage level that increases and decreases one by one assuming that the voltage level is 0 in a case where the test voltage is VI (i = ..., −3, −2, −1, 0, 1, 2, 3, ... ); ni is the number of batteries that were evaluated as "Poor" (or "Good") in tests carried out at respective voltage levels; d is a voltage interval (unit: V) at which the test voltage is increased and decreased; and N is the total number (N=Σ ni) of batteries that were evaluated as "Good (or "Poor") in all nail penetration tests. Then, in a case where the number of "Good" and "Poor", which are evaluations, is counted, a result of "Good" or "Poor" that is higher in number is used over all the nail penetration tests. In a case where "Good" and "Poor" are equal in number, either "Good" or "Poor" may be used. For the value of "±½", in a case where the number of "Good" and "Poor", which are evaluations, is counted, a negative sign is employed when data of "Poor" is used, and a positive sign is employed when data of "Good" is used.

<Microscopic Observation>

A surface of the laminated porous film 1 was observed by use of a scanning electron microscope. FIG. 2 shows an image obtained by the observation. It was possible to confirm by the image that a binder resin B was in point contact with fine particles of mica (isinglass) A.

Example 2

The following A layer and the following B layer were used to form a laminated porous film 2.

<A Layer>

A porous film (A layer) made of polyethylene was prepared as in the case of Example 1.

<B Layer>

A coating slip 2 was prepared as in the case of Example 1, except that hydroxyapatite (manufactured by Wako Pure Chemical Industries, Ltd.) was used as inorganic fine particles in Example 2. Note that the hydroxyapatite is fine particles having cleavability.

<Laminated Porous Film>

The laminated porous film 2 in which the B layer was laminated to one side of the A layer was obtained as in the case of Example 1, except that the coating slip 2 was used in Example 2.

<Evaluation of Physical Properties>

Physical properties and the like of the obtained laminated porous film 2 were measured by the method described earlier. Table 1 shows a result of the measurement.

<Preparation of Laminate-Type Non-Aqueous Electrolyte Secondary Battery>

A laminate-type non-aqueous electrolyte secondary battery was prepared as in the case of Example 1, except that the laminated porous film 2 was used in Example 2.

<Calculation of Solution Resistance of Laminate-Type Non-Aqueous Electrolyte Secondary Battery>

A solution resistance of the laminate-type non-aqueous electrolyte secondary battery was calculated as in the case of Example 1. Table 2 shows a result of the calculation.

<Preparation of Cylindrical Non-Aqueous Electrolyte Secondary Battery>

A cylindrical non-aqueous electrolyte secondary battery was prepared as in the case of Example 1, except that the laminated porous film 2 was used in Example 2.

<Calculation of 50% Breakdown Voltage of Cylindrical Non-Aqueous Electrolyte Secondary Battery (Nail Penetration Test)>

A 50% breakdown voltage of the cylindrical non-aqueous electrolyte secondary battery was calculated as in the case of Example 1. Table 2 shows a result of the calculation.

Comparative Example 1

The following A layer and the following B layer were used to form a laminated porous film (1) for comparison.
<A Layer>
A porous film (A layer) made of polyethylene was prepared as in the case of Example 1.
<B Layer>
A coating slip 3 was prepared as in the case of Example 1, except that silica (manufactured by Sigma-Aldrich Co. LLC. and having an average particle size of 0.5 µm to 10 µm) was used as inorganic fine particles in Comparative Example 1. Note that the silica is fine particles having no cleavability.
<Laminated Porous Film>
The laminated porous film (1) for comparison in which the B layer was laminated to one side of the A layer was obtained as in the case of Example 1, except that the coating slip 3 was used in Comparative Example 1.
<Evaluation of Physical Properties>
Physical properties and the like of the obtained laminated porous film (1) for comparison were measured by the method described earlier. Table 1 shows a result of the measurement.
<Preparation of Laminate-Type Non-Aqueous Electrolyte Secondary Battery>
A laminate-type non-aqueous electrolyte secondary battery was prepared as in the case of Example 1, except that the laminated porous film (1) for comparison was used in Comparative Example 1.
<Calculation of Solution Resistance of Laminate-Type Non-Aqueous Electrolyte Secondary Battery>
A solution resistance of the laminate-type non-aqueous electrolyte secondary battery was calculated as in the case of Example 1. Table 2 shows a result of the calculation.
<Calculation of 50% Breakdown Voltage of Cylindrical Non-Aqueous Electrolyte Secondary Battery (Nail Penetration Test)>

(a) A displacement, during a period from when a dielectric breakdown occurs in a laminate to when the laminate is brought into electrical conduction, in a thickness direction of the laminate in an electrical conduction test by nail penetration in which test the displacement is measured by use of a nail of N50 specified in JIS A 5508 and under a condition in which the nail descends at a descending speed of 50 µm/min and (b) a 50% breakdown voltage of a cylindrical non-aqueous electrolyte secondary battery are in a positive relation. In Comparative Example 1, a 50% breakdown voltage to be obtained in a case where the laminated porous film (1) for comparison was used was calculated from values of the 50% breakdown voltage measured at six points in a range in which the displacement, during the period from when a dielectric breakdown occurs in the laminate to when the laminate is brought into electrical conduction, in the thickness direction of the laminate was 5 µm to 40 µm. Table 2 shows a result of the calculation.

Example 3

A laminated porous film 3 was obtained as in the case of Example 2, except that in Example 3, a B layer had been formed on both sides of an A layer by coating both sides of the A layer with the coating slip 2.
<Evaluation of Physical Properties>
Physical properties and the like of the obtained laminated porous film 3 were measured by the method described earlier. Table 1 shows a result of the measurement.
<Preparation of Laminate-Type Non-Aqueous Electrolyte Secondary Battery>
A laminate-type non-aqueous electrolyte secondary battery was prepared as in the case of Example 1, except that the laminated porous film 3 was used in Example 3.
<Calculation of Solution Resistance of Laminate-Type Non-Aqueous Electrolyte Secondary Battery>
A solution resistance of the laminate-type non-aqueous electrolyte secondary battery was calculated as in the case of Example 1. Table 2 shows a result of the calculation.
<Preparation of Cylindrical Non-Aqueous Electrolyte Secondary Battery>
A cylindrical non-aqueous electrolyte secondary battery was prepared as in the case of Example 1, except that the laminated porous film 3 was used in Example 3.
<Calculation of 50% Breakdown Voltage of Cylindrical Non-Aqueous Electrolyte Secondary Battery (Nail Penetration Test)>
A 50% breakdown voltage of the cylindrical non-aqueous electrolyte secondary battery was calculated as in the case of Example 1. Table 2 shows a result of the calculation.

Comparative Example 2

The following A layer and the following B layer were used to prepare a laminated porous film (2) for comparison.
<A Layer>
A porous film (A layer) made of polyethylene was prepared as in the case of Example 1.
<B Layer>
The laminated porous film (2) for comparison in which the B layer was laminated to one side of the A layer was prepared as in the case of Example 1, except that a coating amount of the coating slip 1 had been changed so that the B layer had a thickness of 13.7 µm.
<Evaluation of Physical Properties>
Physical properties and the like of the obtained laminated porous film (2) for comparison were measured by the method described earlier. Table 1 shows a result of the measurement.
<Preparation of Laminate-Type Non-Aqueous Electrolyte Secondary Battery>
A laminate-type non-aqueous electrolyte secondary battery was prepared as in the case of Example 1, except that the laminated porous film (2) for comparison was used in Comparative Example 2.
<Calculation of Solution Resistance of Laminate-Type Non-Aqueous Electrolyte Secondary Battery>
A solution resistance of the laminate-type non-aqueous electrolyte secondary battery was calculated as in the case of Example 1. Table 2 shows a result of the calculation.
<Calculation of 50% Breakdown Voltage of Cylindrical Non-Aqueous Electrolyte Secondary Battery (Nail Penetration Test)>
A 50% breakdown voltage to be obtained in a case where the laminated porous film (2) for comparison was used was calculated as in the case of Comparative Example 1. Table 2 shows a result of the calculation.

TABLE 1

| | Thickness of A layer (μm) | Lamination of B layer | Fine particles of B layer | Thickness of B layer (μm) | Weight per unit area of A layer (g/m²) |
|---|---|---|---|---|---|
| Example 1 | 17.7 | One side | Mica | 5.0 | 8.2 |
| Example 2 | 16.1 | One side | Hydroxyapatite | 6.9 | 7.2 |
| Example 3 | 16.1 | Both sides | Hydroxyapatite | 19.1 | 7.2 |
| Comparative Example 1 | 17.0 | One side | Silica | 8.8 | 7.1 |
| Comparative Example 2 | 17.7 | Both sides | Mica | 13.7 | 8.2 |

| | Weight per unit area of B layer (g/m²) | Component volume weight per unit area of B layer (cm³/m²) | Difference obtained by subtracting test force of laminate in which dielectric breakdown occurs from test force of laminate which is brought into electrical conduction (N) |
|---|---|---|---|
| Example 1 | 6.2 | 2.2 | 19.0 |
| Example 2 | 7.7 | 2.5 | 5.0 |
| Example 3 | 23.2 | 7.6 | 14.8 |
| Comparative Example 1 | 7.2 | 3.4 | 2.0 |
| Comparative Example 2 | 23.5 | 8.6 | 60.0 |

TABLE 2

| | Solution resistance of laminate-type non-aqueous electrolyte secondary battery (Ω) | 50% breakdown voltage (V) |
|---|---|---|
| Example 1 | 0.32 | 4.20 |
| Example 2 | 0.28 | 4.01 |
| Example 3 | 0.30 | 4.25 |
| Comparative Example 1 | 0.24 | 3.85 |
| Comparative Example 2 | 0.51 | 4.48 |

It is understood that a non-aqueous electrolyte secondary battery which includes a laminate in accordance with the present invention and a non-aqueous electrolyte secondary battery separator in accordance with the present invention is capable of preventing an internal short circuit due to, for example, breakage of the non-aqueous electrolyte secondary battery while maintaining various performance capabilities such as a rate characteristic and a resistance characteristic (solution resistance) of the non-aqueous electrolyte secondary battery (occurrence of the internal short circuit counters the maintenance of the various performance capabilities). Since a commercial battery has a rated voltage of approximately 3.8 V, a 50% breakdown voltage of not less than 3.9 V is required so that safety is ensured. The non-aqueous electrolyte secondary batteries of Examples, each of which non-aqueous electrolyte secondary batteries has a low risk of explosion or ignition at 3.9 V, can be said to be capable of ensuring a high level of safety.

INDUSTRIAL APPLICABILITY

A laminate in accordance with the present invention and a non-aqueous electrolyte secondary battery separator including the laminate are widely usable in the field of production of non-aqueous electrolyte secondary batteries.

REFERENCE SIGNS LIST

1 SUS plate
2 Nail
3 Resistance measuring device
4 Anode sheet
10 Laminate
A Mica
B Binder resin

The invention claimed is:
1. A laminate comprising:
a porous film containing polyolefin as a main component; and
a porous layer containing inorganic fine particles which have cleavability;
the porous layer being laminated to at least one side of the porous film,
the porous layer containing, per one side thereof, a porous layer component in a component volume weight per unit area of 2 cm³/m² to 8 cm³/m²,
the porous layer having, per one side thereof, a thickness of 0.5 μm to 15 μm, and the porous film has a thickness of 5 μm to 30 μm, and
in an electrical conduction test by nail penetration in which test a displacement in a thickness direction of the laminate during a period from when a dielectric breakdown occurs in the laminate to when the laminate is brought into electrical conduction is measured by use of a nail of N50 specified in JIS A 5508 and under a condition in which the nail descends at a descending speed of 50 μm/min, the displacement being not less than 20 μm and not more than 200 μm.
2. The laminate as set forth in claim 1, wherein the porous film has a porosity of 30% by volume to 60% by volume.
3. The laminate as set forth in claim 1, wherein the porous layer further contains a binder resin, and the fine particles are in point contact with the binder resin.
4. The laminate as set forth in claim 1, wherein the porous film has a weight per unit area of 4 g/m² to 20 g/m².
5. The laminate as set forth in claim 1, wherein the porous layer has, per one side thereof, a weight per unit area of 1 g/m² to 20 g/m².
6. A non-aqueous electrolyte secondary battery separator including a laminate recited in claim 1.
7. A non-aqueous electrolyte secondary battery including a laminate recited in claim 1.

* * * * *